United States Patent [19]

Griesbach et al.

[11] Patent Number: 4,935,196

[45] Date of Patent: Jun. 19, 1990

[54] DIFFERENTIAL ATMOSPHERIC TRITIUM SAMPLER

[75] Inventors: Otto A. Griesbach, Langhorne, Pa.; Joseph R. Stencel, Skillman, N.J.

[73] Assignee: The United States of America as represented by the United States Department of Energy, Washington, D.C.

[21] Appl. No.: 103,863

[22] Filed: Oct. 2, 1987

[51] Int. Cl.$^5$ .................. G21C 19/00; G21B 1/00; G21F 9/02

[52] U.S. Cl. .................. 376/314; 376/146; 376/246; 376/256; 73/863.12; 73/863.21

[58] Field of Search ............... 376/146, 256, 314, 313, 376/246; 73/29, 863.12, 863.21, 863.02, 863.03, 863.34, 23.1; 423/248

[56] References Cited

U.S. PATENT DOCUMENTS

| | | |
|---|---|---|
| 3,638,396 | 2/1972 | Lovelock . |
| 3,638,397 | 2/1972 | Charlton . |
| 3,690,835 | 9/1972 | Lovelock . |
| 3,701,632 | 10/1972 | Lovelock . |
| 3,788,813 | 1/1974 | Busch . |
| 3,953,152 | 4/1976 | Sipin ................... 73/863.21 |
| 3,976,450 | 8/1976 | Marcote et al. .......... 73/863.12 |
| 4,019,867 | 4/1977 | Fabian ................... 423/248 |
| 4,091,674 | 5/1978 | Amey .................... 73/864.34 |
| 4,178,350 | 12/1979 | Collins et al. ............ 423/248 |
| 4,196,176 | 4/1980 | Galloway ................ 423/248 |
| 4,464,925 | 8/1984 | Kolloff ................... 73/23.1 |
| 4,532,814 | 8/1985 | Lalin ..................... 73/863.21 |
| 4,621,518 | 11/1986 | Gerdes ..................... 73/29 |
| 4,707,342 | 11/1987 | Iniotakis et al. ............ 423/248 |

FOREIGN PATENT DOCUMENTS

| | | | |
|---|---|---|---|
| 0144796 | 8/1983 | Japan .................. 423/248 |
| 0070398 | 4/1985 | Japan .................. 423/248 |
| 0122394 | 6/1985 | Japan .................. 423/248 |
| 0675342 | 7/1979 | U.S.S.R. ............ 73/863.12 |
| 2040899 | 9/1980 | United Kingdom ........ 376/146 |

OTHER PUBLICATIONS

Fusion Technology, vol. 8, Sep. 1985, pp. 2206–2212, McKay et al.
Tellus XXVI (1974), 1–2, "Atmospheric HT and HTO", Ostlund et al., pp. 91–101.

Primary Examiner—Harvey E. Behrend
Attorney, Agent, or Firm—Helen S. Cordell; John M. Albrecht; William R. Moser

[57] ABSTRACT

An atmospheric tritium sampler is provided which uses a carrier gas comprised of hydrogen gas and a diluting gas, mixed in a nonexplosive concentration. Sample air and carrier gas are drawn into and mixed in a manifold. A regulator meters the carrier gas flow to the manifold. The air sample/carrier gas mixture is pulled through a first moisture trap which adsorbs water from the air sample. The mixture then passes through a combustion chamber where hydrogen gas in the form of $H_2$ or HT is combusted into water. The manufactured water is transported by the air stream to a second moisture trap where it is adsorbed. The air is then discharged back into the atmosphere by means of a pump.

9 Claims, 1 Drawing Sheet

DIFFERENTIAL ATMOSPHERIC TRITIUM SAMPLER

CONTRACTUAL ORIGIN OF THE INVENTION

The U.S. Government has rights to this invention pursuant to Contract No. DE-AC02-76CH03073 between the U.S. Department of Energy and Princeton University.

BACKGROUND OF THE INVENTION

The present invention relates generally to an atmospheric tritium sampler and more particularly to an atmospheric tritium sampler which utilizes a catalyst to combust tritium in gaseous form.

Work toward the goal of fusion energy production is progressing in a number of laboratories throughout the world. In the area of magnetic confinement fusion, the major effort is focused on the tokamak device, which consists of a toroidal vessel that contains a high temperature plasma, surrounded by magnetic field coils that confine and position the plasma.

The three largest tokamaks are the JT-60 in Japan, the Joint European Torus (JET) in England, and the Tokomak Fusion Test Reactor (TFTR) at the Princeton Plasma Physics Laboratory in the United States. Experiments have been conducted on all of these machines using plasmas of hydrogen and deuterium. The TFTR and JET machines plan to use a deuterium tritium mixture as a plasma fuel, which will greatly increase neutron production. Next generation devices, such as the Compact Ignition Tokomak (CIT) device which is proposed to be built at the Princeton Plasma Physics Laboratory, will also use a deuterium-tritium plasma as fuel.

The use of tritium in these machines necessitates the need for environmental tritium monitoring. Therefore, the need arises for a continuous duty air monitoring system which is capable of collecting tritium in vaporous (HTO) and gaseous (HT) forms and is suitable for environmental purposes.

An atmospheric tritium monitoring system may also be useful for sampling the air around fission reactors, particularly breeder reactors which produce tritium.

Various schemes are available for tritium monitoring. U.S. Pat. No. 4,244,783, issued to James A. Corbett, discloses a tritium monitoring system capable of monitoring the tritium content in a reactor fluid. The arrangement taught by Corbett monitors the tritium content by measuring an electric current generated by the tritium in an ionizable medium. U.S. Pat. No. 4,683,749, issued to Norman C. Thurlow, discloses a process and system for detecting and measuring a tritium gas leak from a container.

A system for measuring the tritium content in ambient air is disclosed in U.S. Pat. No. 4,638,674, issued to Eckhard Redmann. The scheme disclosed by Redmann measures the tritium content via the $T_2O$ vapor content in the air sample. This system however neglects the gaseous tritium (HT fraction).

Various monitors exist which are capable of sampling air for HT. Generally these systems consist of a small vacuum pump which samples the air at a known flow rate. The sample air is drawn through a drying column where its moisture is removed and then passes through a heated catalyst, where any gaseous tritium which may be present is converted into water. This "manufactured water" is picked up by the sample air which subsequently passes to another moisture trap where it is adsorbed.

Several drawbacks exist with this arrangement. The first moisture trap, or HTO trap, may not collect all of the water vapor; therefore, some of the vapor in the air may be transferred to the second, or HT trap. This will result in an underestimate of the HTO fraction and an overestimate of the HT fraction. Typically, these tritium monitoring systems utilize an external heat source to heat the catalyst. The use of this external heat source is a further disadvantage to these systems. The external energy source, typically provided by an AC power source, renders these systems impractical for continuous duty in the field, where AC power may not be available.

Another major problem with these systems is the minute quantities of water manufactured by the catalyst from the gaseous tritium in the air sample. At a HT concentration of 1 maximum permissible concentration (MPC) the total manufactured water would amount to less than one microgram after a full week's run. Thus, any loss of the manufactured water before reaching the second moisture trap would result in a major discrepancy.

Systems such as the one disclosed by H. G. Ostlund et al. in "Atmospheric HT and HTO", Tellus XXVI (1974), solve this problem by feeding hydrogen gas to a catalyst. The catalyst combusts the hydrogen along with any tritium gas present in the air sample. The use of the externally supplied hydrogen results in gram quantities of manufactured water, which efficiently transport the microgram quantities of manufactured tritiated water to the drying column.

These systems require a very low hydrogen flow rate. Low hydrogen flow rates are difficult to measure with inexpensive rotometers. Therefore, these systems, which feed hydrogen gas to the catalyst, use an electrolysis cell to supply the hydrogen gas. The rate of hydrogen production is controlled by carefully keeping voltage and current supplied to the electrolysis cell at a constant level.

These systems also have several disadvantages. First, they require an external source to supply the current needed for the electrolysis process. This requirement makes these systems less than ideal for use in a continuous mode. Second, provisions have to be made to assure that the hydrogen concentration level is kept below 4%. Otherwise, the sampler will explode when the gas/air mixture reaches the catalyst. Third, the cell needs to be refrigerated during warm weather, if sampling times are long.

There are further disadvantages in the particular system disclosed by Ostlund et al. In this particular arrangement the hydrogen is catalytically oxidized in a combustion trap. The combustion trap, which is comprised of a bed of palladiam carried on a molecular sieve, serves dual functions. The combustion trap, both oxidizes the hydrogen/tritium into water and acts as a moisture trap. For sample recovery, the molecular sieve needs to be heated, under vacuum, to over 500° C. for up to eight hours. Further, since no sample recovery is ever complete, a "tritium memory" may present a problem with the accuracy of future sampling runs. Therefore, in view of the above, it is an object of the present invention to provide an atmospheric tritium sampler capable of being continuously operated in the field.

It is a further object of the invention to provide an atmospheric tritium sampler capable of detecting the fraction of tritium in gaseous form from an air sample.

It is another object of the invention to provide an atmospheric tritium sampler which does not use an external heat source or an external AC power source.

It is still another object of the present invention to provide an atmospheric tritium sampler which avoids memory effects.

It is still a further object of the present invention to provide an atmospheric tritium sampler which may be safely operated and does not use explosive components.

Additional objects, advantages and novel features of the invention will become apparent to those skilled in the art upon examination of the following or may be learned by practice of the invention. The objects and advantages of the invention may be realized and attained by means of the instrumentalities in combinations particularly pointed out in the appended claims.

SUMMARY OF THE INVENTION

To achieve the foregoing and other objects and in accordance with the purposes of the present invention, as embodied and broadly described herein, the atmospheric tritium sampler of this invention uses a carrier gas comprised of a mixture of hydrogen and a diluting gas. The hydrogen concentration in the carrier gas is maintained below 4% in order to be below the lower explosive limit of hydrogen.

Sample air and carrier gas are drawn into and mixed in a manifold. A regulator meters the flow of the carrier gas into the manifold. The air sample/ carrier gas mixture is next pulled through a first moisture trap which adsorbs water from the air sample. The mixture then passes through a combustion chamber, where all of the hydrogen gas, supplied by either the carrier gas or found in the air sample as $H_2$ or HT, is combusted into water. The resultant, manufactured water is transported by the air stream to a second moisture trap where it is adsorbed. The air is finally pulled through and discharged back into the atmosphere by a pump.

DETAILED DESCRIPTION OF THE INVENTION

Figure 1:
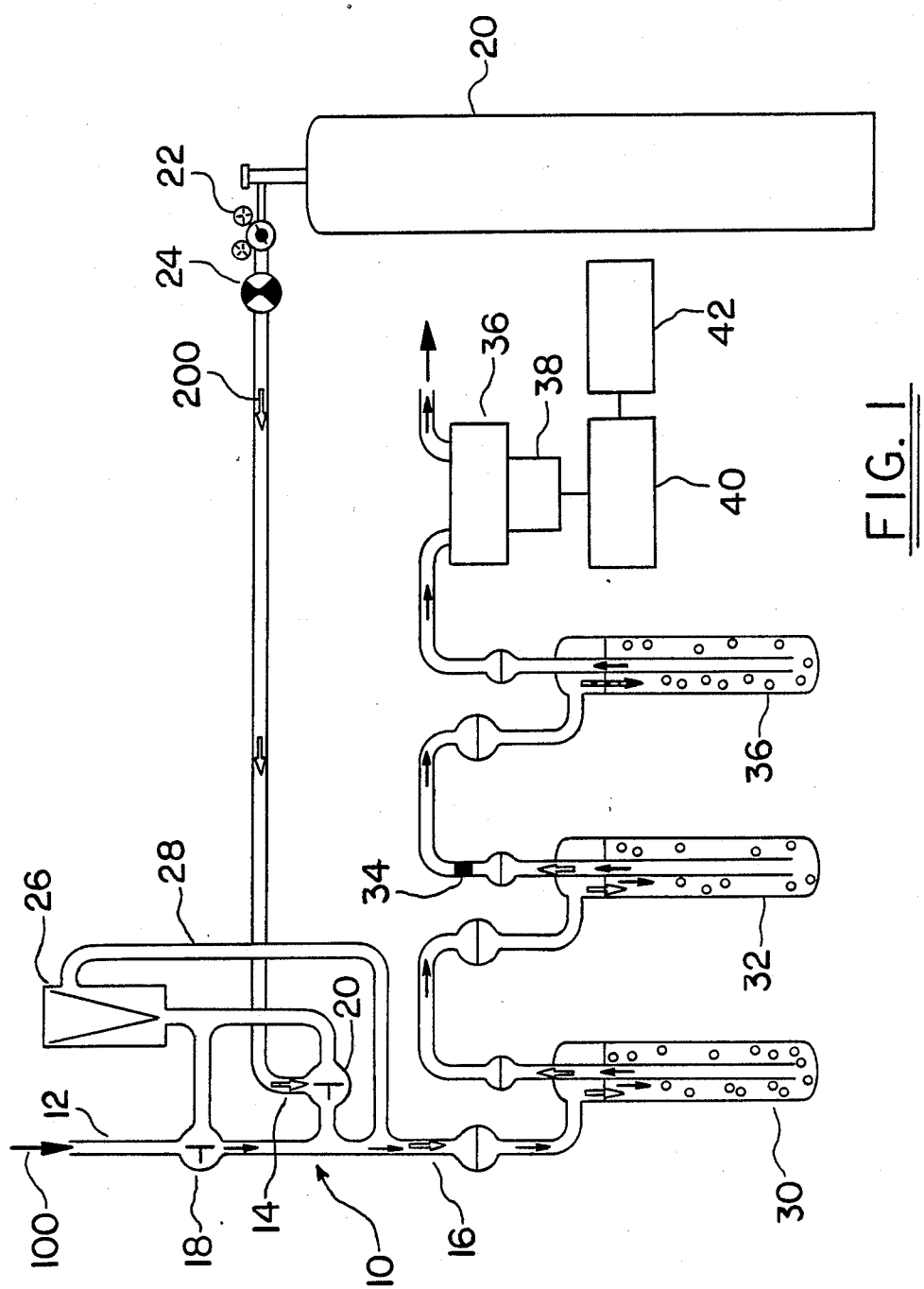
FIG. 1 is a schematic representation of the atmospheric tritium sampler of the present invention.

Reference will now be made to the present preferred embodiments of the invention, an example of which is illustrated in FIG. 1. Sample air, represented by arrows 100, is drawn into an intake port 12 of manifold 10. A carrier gas, represented by arrows 200, is supplied and contained in vessel 20. The carrier gas 200 is fed into intake port 14 of manifold 10 and metered by a regulator 22, preferably of the two stage type, and rotometer 24. Air sample 100 and carrier gas 200 are combined in manifold 10 and the mixture exits through output port 16 of manifold 10.

In a preferred embodiment of the present invention, a first three way valve 18 is connected to air sample intake port 12 and a rotometer 26. A second three way valve 20 is connected to carrier gas intake port 14 and rotometer 26. In this embodiment three way valves 18 and 20 divert the air sample 100 and carrier gas 200 respectively, to rotometer 26 when the sampling rate needs to be determined. The mixture is then fed back to output port 16 of manifold 10 via return segment 28. In the normal operating mode, the three way valves 18 and 20 are operated in a position such that they cause the air 100 and carrier gas 200 to bypass the rotometer 26.

Since the rotometer 26 is only used during readings, it stays clean and therefore more accurate than if it were in continuous operation. Further, this embodiment avoids condensation and HTO loss in rotometer 26 which may occur under unfavorable temperature and humidity conditions.

The air sample/carrier gas mixture is next pulled through a drying column or moisture trap 30. Preferably a second moisture trap 32 is connected in series with moisture trap 30. In this embodiment, at normal sampling rates, all of the air's moisture will be trapped by the first moisture trap 30. The second moisture trap 32 provides redundant moisture trapping capabilities to the first moisture trap 30 in case of breakthrough in the first moisture trap 30. This may occur if the air sample has a high humidity content. In this event, the second trap 32 will trap the moisture. During normal operations the back up moisture trap 32 will not adsorb any moisture and thus, the mass of this trap will remain constant.

The air sample/carrier gas, now devoid of any moisture is next drawn through a small chamber, such as a glass column, packed with a catalyst which oxidizes hydrogen into water. Preferably the catalyst is a palladium sponge catalyst. The catalyst 34 is held in place in the glass column by any conventional means, such as by glass wool plugs on each end of the column. Preferably the outside of this column, in the immediate vicinity of the catalyst 34, is insulated to minimize heat loss.

No external heat source is needed in the arrangement of the present invention, since the catalyst is fuelled by the carrier gas. The carrier gas 200 is comprised of a mixture of hydrogen and a diluting gas. The concentration of hydrogen in carrier gas 200 must be below 4%, in order to avoid an explosive reaction at catalyst 34. The diluting gas may be any gas which will define a non-explosive mixture of hydrogen and diluting gas when it reaches catalyst 34. Examples of diluting gas are nitrogen or any of the inert gasses. The preferred carrier gas consists of a 3% hydrogen and a 97% nitrogen concentration by volume. This mixture comprises a carrier gas which is nonexplosive and safe.

The carrier gas 200 may be ordered from a commercial vendor as a custom-mix and may be obtained in any size cylinder desired. The specifications for the carrier gas should include a certification as to its hydrogen percentage by gas chromatography. Preferably the vendor selected obtains all of the hydrogen as a byproduct of the petrochemicals industry. This assures that the hydrogen is essentially tritium free, and that any water manufactured by the catalyst 34 will be "dead water" and not contribute to any tritium activity.

All of the hydrogen gas, supplied by either the carrier gas 200 or found in the air sample 100, as hydrogen or HT, is combusted by the catalyst 34. The resultant manufactured water is transported by the air stream to a third moisture trap 36 where it is adsorbed. At this stage, the tritium has been removed from the air sample. The water vapor fraction is contained in the first moisture trap 30 and the gaseous tritium in the third moisture trap 36.

The mass of moisture trap 36 will increase due to the adsorbed moisture. This information may be used to calculate the catalyst's combustion efficiency using non radio active means. The information may also be used to determine the catalyst's efficiency for each particular sample run. The combustion efficiency should be near 100%.

The air sample is finally pulled through a diaphragm micropump 36 and then discharged back to the atmosphere. Micropump 36 is operated by means of a DC motor 38. A DC power supply 40 is used to run motor 38. The pump speed is controlled by increasing or decreasing the voltage supplied to the pump, thus insuring precise control of the sampling rate. No throttle is used; therefore, the pump 36 operates under less strain, lower voltage and draws less current. Typically, a pump, as described as above, will draw about 3 volts and less than 20 milliamps of current. At this low consumption level, it becomes feasible to operate the unit in the field where no AC power may be available. Field operation is also possible because the catalyst operates without any external heat source.

When AC power is available, the pump 36 may be powered by the AC power supply. However, an elapsed time meter 42 is needed to warn of any AC power interruptions during the sample run.

Although molecular sieve, silica gel and ethylene glycol are widely used as desiccants, in the preferred embodiment of the invention silica gel is used as the trapping material in moisture traps 30, 32 and 36.

Alumina-silicate based molecular sieve, "Type 4A" is very efficient at higher flow rates, such as flow rates in the tens of liters per minute. Silica gel (and ethylene glycol) however, may be used at lower flow rates, such as flow rates at 100 or 200 cc/min.

Molecular sieve and ethylene glycol have the following sample recovery problems associated with them. Molecular sieve needs to be heated to over 500° C., under vacuum, for up to eight hours. Ethylene glycol cannot be separated from the sample. Silica gel needs only baking out at 400° C. for two hours to obtain a 95% sample recovery.

As stated above, no sample recovery is ever complete and a tritium memory may be left in the trapping material. Silica gel is relatively inexpensive compared to molecular sieves. The silica gel vapor trap may be discarded and replaced with a new silica gel vapor trap after each run, thereby avoiding the tritium memory problem. Further, silica gel is easier to prepare for a sample run. Oven drying at 150° C. for eight hours will remove most of its moisture.

Silica gel's advantage over ethylene glycol lies in its better detection sensitivity, not in its trapping ability. Samples containing ethylene glycol will yield lower counting efficiency and be of smaller volume.

The tritium may now be recovered from the moisture traps by conventional techniques. The drying columns or moisture traps are placed into a bake-out furnace and attached to liquid nitrogen cooled cold traps, which in turn are connected to a mechanical vacuum pump.

It is preferred that the silica gel be prepared for sample runs at a drying temperature of only 150° C. Increasing the dry-out temperature above 150° C. will damage the silica gel and therefore, impair its drying efficiency.

It is preferred however, that the bake-out temperature for sample recovery be at 400° C. and that the bake-out be performed for more than one hour. A lower temperature will result in incomplete recovery. At a bake-out temperature of 150° C., 100% water recovery appears to take place. However, only about half of the tritium will be contained in this sample. A 400° C. bake-out temperature will cause the remnant tritium to be released from the silica gel. Water recovery will appear to be greater than 100%. This is due to the fact that the silica gel was prepared for the sample run at a drying temperature of only 150° C., not 400° C.

Although this excess water appears to be a drawback, it in fact results in an advantage to the recovery process. In sample runs of short time duration, only milligram quantities of tritiated water will be contained in the traps. Quantitative recovery will be poor and highly variable. The residue of water however, will flush out any of the tritiated water. More than 90% of the tritium will be recovered, and in fact, most bake-outs will yield better than 95%.

Liquid scintillation spectrometry may then be used to assay the tritium. The sample may be mixed with a counting solution such as "Insta-Gel" which may be purchased from United Technologies. Counting is preferably delayed for 24 hours to dark-adapt the sample and to allow for the decay of short-lived isotopes that may be present.

To illustrate the atmospheric tritium sampler of the present invention the following example is presented. An air sampling rate of 100 cc/min. is assumed. Each of vapor traps 30, 32 and 36 contain 150 grams of silica gel. At the sampling rate stated above, all of the air's moisture will be trapped by the first drying column 30. Breakthrough will occur after one week of operation, if the air is high in humidity. In that event, the second drying column 32 will trap the moisture. However, the samples should be changed on a weekly basis. Since the trap 30 is oversized for a one-week sampling period, no breakthrough should occur. The backup drying column 32 will therefore not adsorb any moisture and the mass of this trap will remain constant.

The chamber containing the catalyst 34 is packed with approximately 2 grams of palladium sponge catalyst. The palladium sponge is held in place by glass wool plugs placed on each end of the catalyst.

The carrier gas is metered to the catalyst by a two stage regulator and a rotometer at a pressure of less than 5 psi and a constant flow rate of 33 cc/min. The hydrogen portion of this carrier gas amounts to 1 cc/min. This hydrogen flow rate would be difficult to measure with an inexpensive rotometer. However, since the hydrogen is diluted with nitrogen, the flow rate is 33 cc/min., which may be more easily metered.

The carrier gas is contained in an "H" size cylinder, which contains enough gas to operate the catalyst for more than 4 months. (A small, portable "E" sized cylinder will last for 6 days.)

In a weeks time, at the sample rate given above, the mass of moisture trap 36 will increase by approximately 8 grams due to the adsorption of HT.

The disclosed atmospheric tritium sampler thus, provides a continuous duty air sampler, capable of collecting HTO and HT, which is suitable for environmental purposes. Heating of a catalyst and/or using an explosive carrier gas are avoided. AC power is not required. By the use of low cost moisture traps, the moisture traps may be discarded after each sample run, thereby avoiding memory effect problems. It will be readily apparent to those skilled in the art that the disclosed invention may have other uses such as stack sampling or health physics applications.

The foregoing description of the preferred embodiments of the invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined as follows:

1. An atmospheric tritium sampler comprising:
   (a) a means for providing and containing a carrier gas, said carrier gas comprising a mixture of $H_2$ and a diluting gas, the $H_2$ concentration in said carrier gas comprising less than 4 per cent of said mixture;
   (b) manifold means for drawing in an air sample through an air intake port and said carrier gas through a carrier gas intake port and for exhausting a mixture thereof through an output port, said air sample containing moisture and HT therein;
   (c) regulating means for metering the flow of carrier gas to said manifold means;
   (d) a first moisture trap, connected to receive the exhaust from said manifold means, for adsorbing the moisture from said air sample and exhausting the balance of said air sample/carrier gas mixture;
   (e) combustion chamber means, connected to receive the exhaust from said first moisture trap, for combusting $H_2$ and HT and producing water therefrom;
   (f) a second moisture trap connected to and separate from said combustion chamber means, said second moisture trap receiving the exhaust from said combustion chamber means and adsorbing said produced water; and
   (g) discharge means for exhausting the balance of said air sample/carrier gas mixture from said second moisture trap into the atmosphere.

2. The atmospheric tritium sampler of claim 1 wherein said combusting means comprises a chamber and a palladium sponge catalyst disposed therein.

3. The atmospheric tritium sampler of claim 2 wherein said first and second moisture traps comprise a silica gel.

4. The atmospheric tritium sampler of claim 3 wherein said hydrogen concentration in said carrier gas is 3 per cent.

5. The atmospheric tritium sampler of claim 4 further comprising sampling means for determining the air sample flow rate.

6. The atmospheric tritium sample of claim 5 wherein air sampling means comprises a rotometer, a first three way valve, a second three way valve, and a return segment, said first three way valve connected to said air intake port and said rotometer, said second three way valve connected to said carrier gas intake port and said rotometer, such that said air sample and said, carrier gas are diverted to said rotometer and to said manifold means from said rotometer through said return segment when the flow rate of said air sample need to be determined and said air sample and carrier gas bypass said rotometer under normal operation.

7. The atmospheric tritium sampler of claim 6 further comprising a third moisture trap disposed between said first moisture trap and said combustion chamber means, said third moisture trap providing redundant moisture trapping capabilities to said first moisture trap.

8. The atmospheric tritium sampler of claim 7 wherein said diluting gas is comprised of nitrogen.

9. A method for extracting tritium from an atmosphere air sample comprising:
   (a) providing a carrier gas, said carrier gas comprising a mixture of $H_2$ and a diluting gas, the $H_2$ concentration in said carrier gas comprising less than 4 per cent of said mixture;
   (b) creating a mixture with known concentration of said air sample and said carrier gas;
   (c) drawing moisture from said air sample/carrier gas mixture in a first moisture trap and exhausting the balance of said mixture into a combustion chamber;
   (d) combusting $H_2$ and HT present in said air sample/carrier gas mixture to form tritiated water therefrom, and exhausting said mixture into a second moisture trap; and
   (e) trapping said tritiated water in a second moisture trap and exhausting the balance of said air sample/carrier gas mixture into the atmosphere.

* * * * *